Nov. 26, 1935.　　J. C. WOODFORD　　2,022,630
AUTOMOBILE SERVICE EQUIPMENT
Filed May 26, 1934　　2 Sheets-Sheet 1
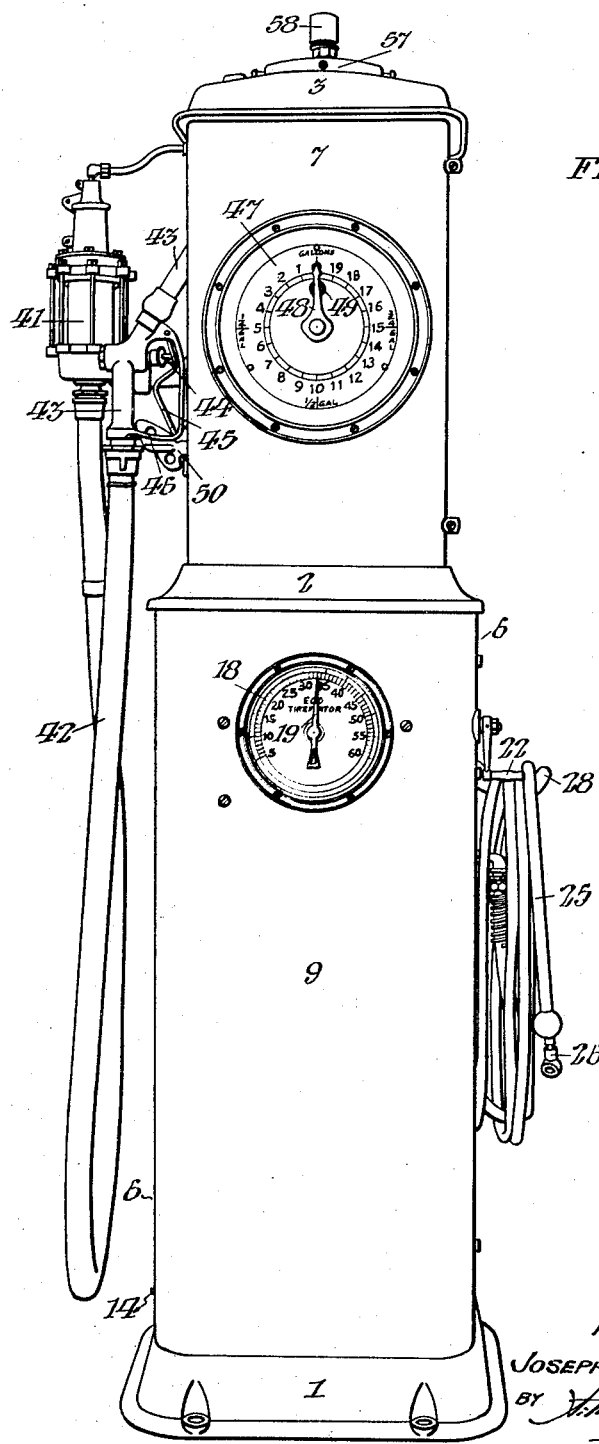
FIG. I.
INVENTOR:
JOSEPH C. WOODFORD,

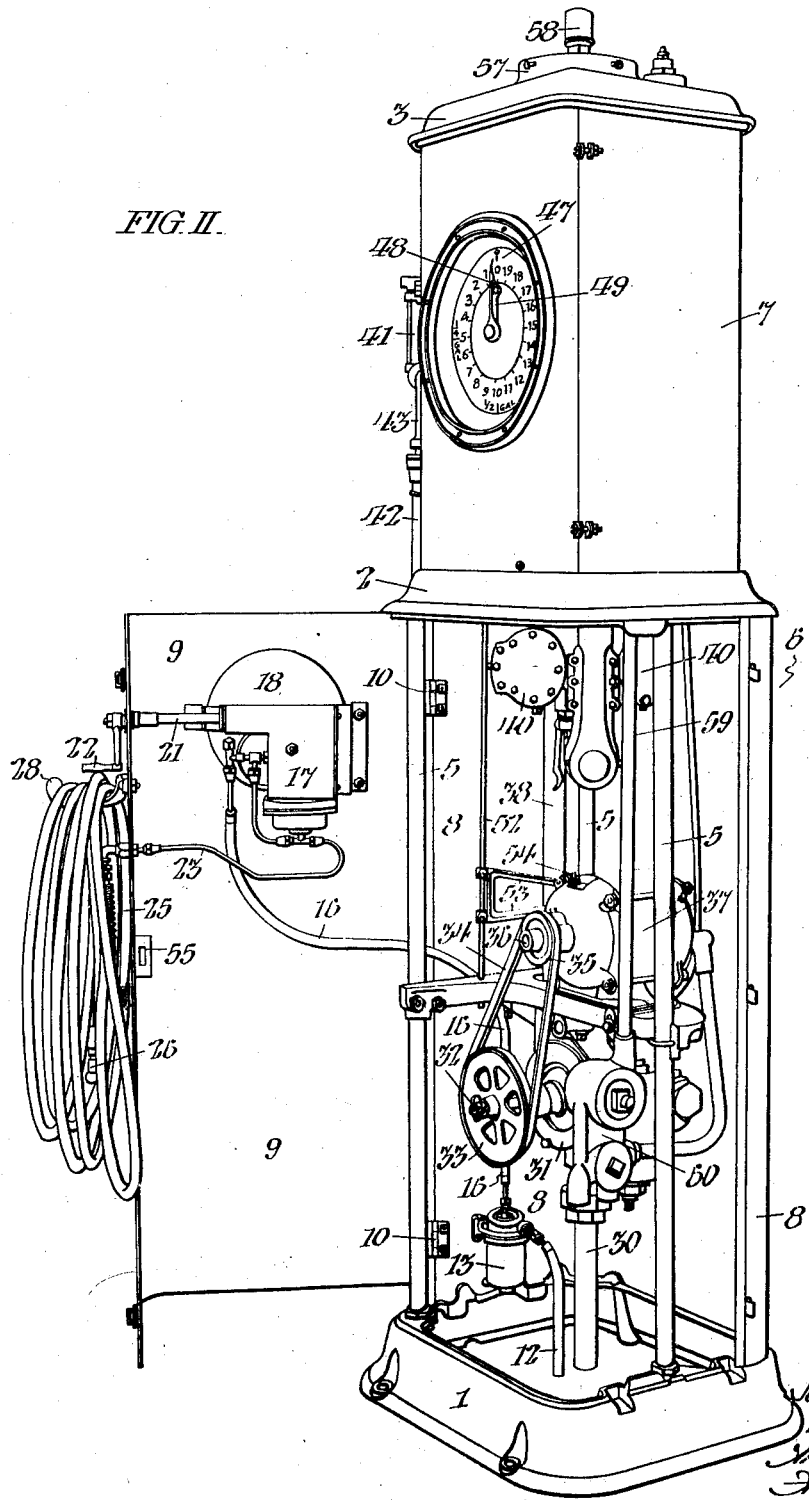
Nov. 26, 1935. J. C. WOODFORD 2,022,630
AUTOMOBILE SERVICE EQUIPMENT
Filed May 26, 1934 2 Sheets-Sheet 2
FIG. II
INVENTOR:
JOSEPH C. WOODFORD Patented Nov. 26, 1935

2,022,630

UNITED STATES PATENT OFFICE 2,022,630

AUTOMOBILE SERVICE EQUIPMENT

Joseph C. Woodford, Haverford, Pa., assignor to Service Station Equipment Company, Conshohocken, Pa., a corporation of Delaware Application May 26, 1934, Serial No. 727,634

8 Claims. (Cl. 221—73.5)

The principal part of such equipment is means for supplying gasolene from an underground tank through a dispensing hose into the tanks of automobiles; for which the owner of the service station is paid. However, it is customary for the owners of such stations to supply what is termed "free air" for inflation of the automobile tires, necessitating the provision of equipment for dispensing compressed air at pressures which may be varied by the operator in accordance with the size and kind of tires to be inflated and for which the owners of the stations are not paid, the only reward for such service being the attraction of customers for the other service for which payment is made. However, as ordinarily constructed and arranged, such air dispensing equipment is costly and so cumbersome that a separate casing must be provided for it and, ordinarily, such air servicing equipment is located at the station more or less remote from the location of the gasolene dispensing equipment, not only necessitating traverse of the operator back and forth between the two types of equipment but necessitating the movement of the automobile from one equipment to the other and retardation of the dispensing of gasolene to a succession of paying customers by the obstruction of the station driveway by customers waiting for free air.

The object and effect of my invention is to provide means for servicing both gasolene and air from the same equipment casing while the automobile remains at the same spot, with the advantages of, first, simplifying the original cost of construction of the equipment; second, reducing the ground space required for such equipment substantially fifty per cent.; third, permitting the automobiles to receive both services simultaneously, thus minimizing by fifty per cent., the amount of time the automobile is occupying space at the station; and, fourth, inducing the customer to buy gasolene at the same time that free air is received because of the fact that both services can be rendered simultaneously and without movement of the automobile from one position to another.

This application is owned by Service Station Equipment Company, a corporation of delaware, which manufactures air dispensing apparatus in accordance with my invention subject matter of Letters Patent of the United States 1,854,010 granted to said corporation April 12, 1932, and including variable pressure controlling apparatus constructed and arranged as disclosed in my pending application Serial No. 493,776 filed November 6, 1930, for Letters Patent of the United States for improvement in fluid dispensing apparatus; and also manufactures Liquid dispensing apparatus such as described and claimed in Letters Patent of the United States 1,879,308 granted to said corporation September 27, 1932. The latter apparatus is of what is known as the curbstand pump type including a vertically extending columnar frame inclosed in a casing including two tubular sections of sheet metal, one above the other, containing a pump operative by an electric motor to raise gasolene from a subjacent tank and deliver it through a meter to and through a dispensing hose under control of a nozzle at the end of the hose containing a valve. The air dispensing apparatus includes means for releasing air compressed to, say, one hundred and fifty pounds per square inch, from an underground pipe through means for cleaning dust from the air and variably controlling and regulating the pressure of air dispensed through a hose.

In accordance with my present invention, the essential elements of such air dispensing equipment are embodied in said casing of the liquid dispensing equipment and, in the form of my invention hereinafter described, the air dispensing equipment is made as an accessory to the liquid dispensing equipment by mounting it in a casing section adapted to be substituted for the ordinary lower section of the casing of the liquid dispensing equipment. Such accessory casing section, which is a substantially rectangular tube with rounded corners, is divided in two equal parts, diagonally through the corners, and one L-shaped half thereof is secured in fixed position upon the frame aforesaid and the other half hinged to that stationary part, as a door which may be opened to afford access to the entire interior of the casing but is normally closed and locked to prevent such access. The essential elements of the air dispensing equipment are mounted upon the inside of that door, with a circular dial of the controlling mechanism indicating the pressure at which the air is to be dispensed exposed upon the outside of the door. Such controlling mechanism has a handle projecting laterally from the door for variably adjusting such pressure; the air cleaning element of the equipment being fixed in the stationary part of the casing, in communication with the compressed air tank, and the hose for dispensing the air being extended exterior to the casing and normally coiled upon a bracket projecting from the movable portion of the casing ready to be extended by the operator to the several tires of the automobile.

My invention includes the various novel features of construction and arrangement hereinafter more definitely specified.

In said drawings; Fig. I is a front elevation of automobile service equipment, of the curb-stand type, embodying my invention.

Fig. II is a perspective view of said equipment with the door which forms part of the lower section of the casing opened to afford access to the service equipment inclosed by said casing, including means for dispensing both gasolene and compressed air.

In said figures; the housing for said equipment, which is adapted to be rigidly mounted upon a pavement or platform at the curb of a driveway, includes three transversely extending cast metal frame members, viz., the base member 1, the intermediate member 2, and the top member 3. Said frame members 1, 2, and 3 are permanently rigidly connected in the vertical relation shown by a columnar frame including the three standards 5 shown in Fig. II connecting the frame member 1 with the frame member 2, and similar standards, which are not shown, but which connect said frame member 2 with the frame member 3. Said housing includes the two casing sections 6 and 7, one above the other, which are rectangular tubes with rounded corners. The section 6 is divided diagonally to form the two similar parts 8 and 9 which are L-shaped in cross section, each forming two side panels of the casing section 6. Said casing part 8 is rigidly secured to said frame between said base frame member 1 and intermediate frame member 2, as best shown in Fig. II. The member 9 of said casing 6 is connected by the hinges 10 with said casing member 8 so that said casing member 9 may be swung upon said hinges as a door which is normally closed, as shown in Fig. I, to prevent access to the equipment within said housing, but may be opened as shown in Fig. II to afford ready access to the entire equipment. Said hinges 10 which are secured to the casing member 8 by bolts, as shown in Fig. II, constitute means for detachably connecting said casing members 8 and 9.

The air dispensing equipment is conveniently connected by the conduit 12 with a tank supplied with air compressed to, say, one hundred and fifty pounds per square inch, which may be located underground or otherwise. Said conduit 12, which extends from said tank into said housing through said base member 1 is directly connected with the air cleaner 13 which is conveniently rigidly connected with the stationary member 8 of the casing section 6, as shown in Fig. II. Said cleaner may be of the centrifugal type shown in my Patent 1,854,010 aforesaid and provided with a dust blow-off outlet which is normally closed by the member 14 indicated at the left hand side of the casing section 6 in Fig. I. The outlet from said cleaner for the purified air is connected by the flexible conduit 16 with the air pressure controlling mechanism 17 which is rigidly connected with the door member 9 of said casing section 6 and includes the dial 18 and rotary indicator 19 mounted upon the exterior of said door member 9 of the casing 6, as shown in Fig. I. Said air pressure controlling mechanism is conveniently of the type shown in my pending application Serial No. 493,776 aforesaid and including an internal pressure regulating spring the stress of which may be varied by rotation of the screw shaft 21 which may be manually turned by the crank handle 22 to variably predetermine the pressure at which the air shall be dispensed. As indicated in Fig. I, said controlling mechanism is set to dispense air at thirty-three pounds per square inch; such dispensation being effected through the conduit 23 which extends to the panel at right angles to the panel of said door member 9 upon which the controlling mechanism 17 is mounted, and said conduit 23 is connected with the flexible dispensing hose 25 which is provided at its free end with the usual valve controlled chuck 26 for detachably fitting the valve tube of a tire. Said hose 25 is conveniently normally coiled upon the bracket 28 which is rigidly connected with said door member 9, as shown.

The liquid dispensing equipment is conveniently connected by the conduit 30 with a tank in which the liquid is stored, which may be located underground or otherwise. Said conduit 30 which extends from said tank into said housing through said base member 1 is directly connected with the pump 31 which is operated by rotation of the shaft 32 which is turned by the belt wheel 33 which is connected by the belt 34 with the belt wheel 35 on the armature shaft 36 of the electric motor 37. The liquid is discharged from said pump 31 through the conduit 38 and flow meter 40 and sight gage 41 to the flexible dispensing hose 42 provided with the nozzle 43 having the valve 44 operable by the lever handle 45 in the guard frame 46 of the nozzle. Said flow meter 40 is operatively connected with means to indicate the volume of liquid dispensed, including the stationary dial 47 and rotary indicating hands 48 and 49. Said hand 48 makes one revolution for each gallon of liquid dispensed and said hand 49 is moved the angular distance from one numeral to another on said dial for each gallon dispensed.

As shown in Fig. I, said nozzle 43 is normally supported by its guard upon the controlling lever 50 with its free end extending into the upper casing section 7. Said lever 50 is connected by the vertically reciprocatory rod 52 with the arm 53 for operating an electric switch 54 controlling said motor 37; so that said switch is opened and said motor stopped to prevent dispensation of liquid when said nozzle is in the normal idle position shown in Fig. I. However, when said nozzle is removed from its idle position and said lever 50 uplifted, said switch is closed and the pump started to dispense liquid through said nozzle.

As above noted, such equipment permits service of an automobile both with compressed air and gasolene while the automobile remains in the same spot, local to said housing. The operator may manually adjust said crank 22 to predetermine the desired pressure of air to which any tire is to be inflated and then uncoil the hose 25 from its normal position shown and apply the chuck 26 to the valve of the tire until the latter is inflated and then return the hose to the coiled position shown. Simultaneously, said nozzle 43 may be removed from its idle position and inserted in the tank of the automobile and the latter charged with the desired volume of gasolene indicated by the dial. Said door member 9 may be locked by any suitable means, indicated at 55.

The annular flange 57 on said frame member 3 is to hold a translucent globe over a lamp in the socket 58, which is energized by conductors through the conduit 59 having the fitting 60 for engagement with an underground conduit.

I do not desire to limit myself to the precise details of construction and arrangement herein set forth, as it is obvious that various modifications may be made therein without departing from the essential features of my invention, as defined in the appended claims.

I claim:

1. In automobile service equipment, an accessory fitted to liquid dispensing apparatus, including a tubular casing comprising relatively movable members with means for detachably connecting said members to inclose said apparatus; means normally securing said members in closed position; compressed air dispensing equipment, including controlling means, for adjustably varying the pressure of air to be dispensed, mounted upon the inner side of and movable with one member of said casing, independently of the other members of said casing, for affording access to the controlling mechanism normally on the inner side thereof, and means visible from the exterior of said casing indicating the pressure at which said controlling means is adjusted.

2. Apparatus as in claim 1, including means maintaining one of said casing members stationary; wherein a member of the casing relatively movable with respect to said stationary member forms a door hingedly supported by said stationary member; a flexible dispensing hose; and means carried by said door for normally supporting said hose coiled in idle position; whereby said hose coil may be shifted to and from operative position by movement of said door.

3. In automobile service equipment, an accessory to liquid dispensing apparatus, including a tubular casing comprising hingedly connected relatively movable members, one of which forms a door; means for detachably connecting said members to inclose said apparatus; means normally securing said members in closed position; means maintaining one of said members stationary; compressed air dispensing equipment, including controlling means mounted upon the inner side of said door, independently of the stationary member of said casing, including means for adjustably varying the pressure of air to be dispensed, and means, carried by and movable with said door, visible from the exterior of said casing, indicating the pressure at which said controlling means is adjusted.

4. In automobile service equipment, the combination with a stationary frame; of a casing formed of sheet metal members for inclosing said frame; means maintaining one of said casing members in fixed relation with said frame; means hingedly connecting another of said casing members with said fixed casing member for use as a door affording access to the interior of said casing; conduit means fixed within said frame for supplying fluid therein; a flexible conduit having one end connected with said fixed conduit and the other end fixed on the inner side of said door; fluid controlling means mounted on the inner side of said door in connection with said flexible conduit; means for effecting adjustment of said controlling means, including an operating handle projecting from said controlling means to the exterior of said door; means carried by and visible from the outer side of said casing door member, indicating the adjusted position of said fluid controlling means; and means carried by and movable with said door for dispensing fluid exterior to said casing, including a flexible hose; and bracket means carried by said door for supporting said dispensing hose in idle position upon said door, independently of the stationary portions of the equipment.

5. In automobile service equipment, the combination with a stationary frame; of a casing formed of sheet metal members for inclosing said frame; means maintaining one of said casing members in fixed relation with said frame; means hingedly connecting another of said casing members with said fixed casing member for use as a door affording access to the interior of said casing; conduit means fixed within said frame for supplying fluid therein; a flexible conduit having one end connected with said fixed conduit and the other end fixed on the inner side of said door; fluid controlling means mounted on the inner side of said door in connection with said flexible conduit; means for effecting adjustment of said controlling means, including an operating handle projecting from said controlling means to the exterior of said door; means carried by and visible from the outer side of said casing door member, indicating the adjusted position of said fluid controlling means; and means carried by and movable with said door for dispensing fluid exterior to said casing, including a flexible hose.

6. In automobile service equipment, the combination with a single housing including a door; of means normally securing said housing and door closed; fluid dispensing equipment secluded in said housing and including means for dispensing compressed air, fixed upon the inner side of said door and movable therewith; means in said casing for controlling the dispensation of fluid therefrom including means adjustable to vary the pressure of air dispensed; means upon the exterior of said casing for adjusting said controlling means and means visible from the exterior of said housing, when closed, for determining characteristics of the fluid dispensed; whereby all of said controlling means is rendered accessible when said door is open and inaccessible when said door is closed but an automobile may be served with a plurality of fluid dispensing operations, at different pressures, while in the same position local to said housing, and while the latter is closed.

7. In automobile service equipment, the combination with a housing comprising an outer casing member of sheet metal, forming a door; of means forming a vertical axis for said door; means normally securing said member in closed position; fluid dispensing apparatus including variable pressure controlling means fixed in stationary position upon the inner side of said door casing member; and variable pressure indicating means operatively related to said controlling means, and fixed in stationary position upon the outer side of said door casing member, so as to be visible when said door is shut.

8. In automobile service equipment, the combination with a housing comprising an internal frame and an outer casing; said casing comprising a portion which is stationary and a portion which is hingedly connected therewith, forming a door; of means normally securing said door in closed position; compressed air dispensing equipment, including controlling means, for adjustably varying the pressure of air to be dispensed, mounted upon the inner side of and movable with said door; and means visible from the exterior of said casing, when the latter is closed, indicating the pressure at which said controlling means is adjusted; whereby all of said controlling means is rendered accessible when said door is open and inaccessible when said door is closed.

JOSEPH C. WOODFORD.